Feb. 7, 1939. O. KYLIN 2,146,583
CHUCK AND BAR FEED
Filed May 6, 1937 3 Sheets-Sheet 1
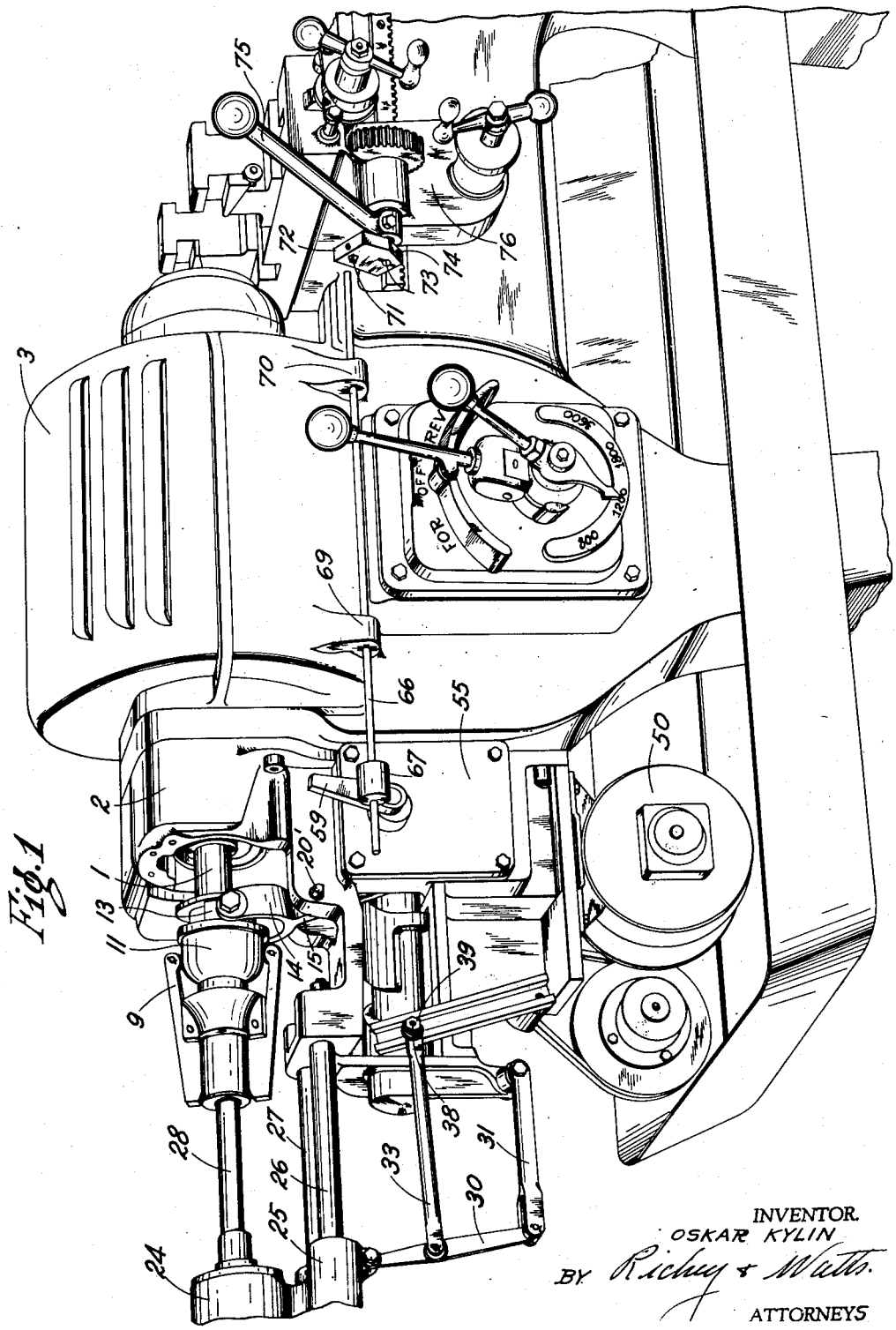
INVENTOR.
OSKAR KYLIN
BY Richey & Watts
ATTORNEYS

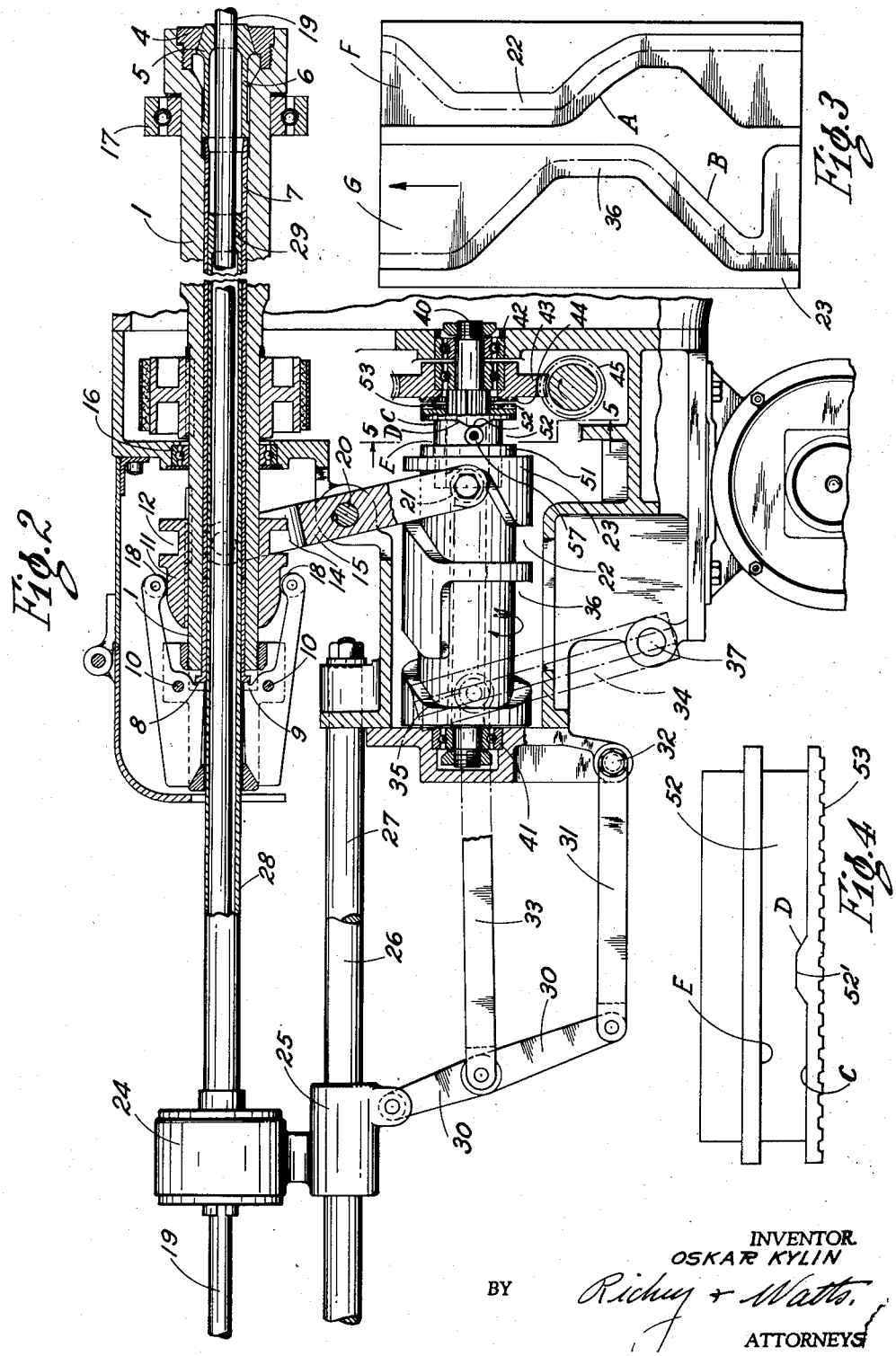

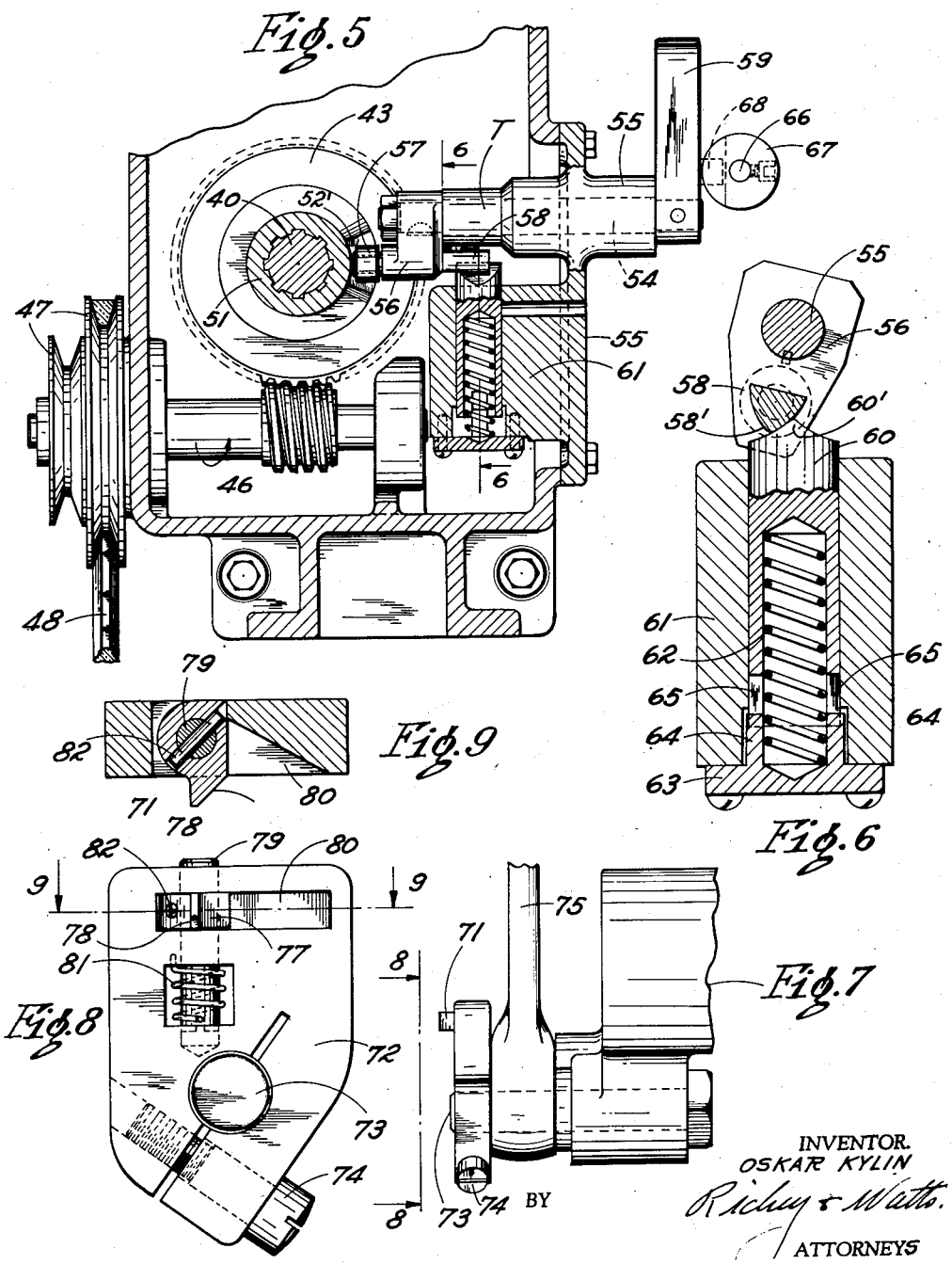

Patented Feb. 7, 1939

2,146,583

UNITED STATES PATENT OFFICE 2,146,583

CHUCK AND BAR FEED

Oskar Kylin, Cleveland Heights, Ohio, assignor to Bardons & Oliver, Inc., Cleveland, Ohio, a corporation of Ohio Application May 6, 1937, Serial No. 141,109

9 Claims. (Cl. 29—62)

This invention relates to machine tools and more particularly to an improved bar stock feeding and gripping mechanism therefor. In machine tools such as screw machines, turret lathes and the like, having a hollow rotating spindle through which the bar stock is advanced into position to be operated upon by cutting tools, a number of mechanisms have been proposed and used for feeding the bar stock through the hollow spindle and for gripping or chucking same to cause it to be driven by the spindle and held in working position. In apparatus of this nature it is important that the operation of the stock gripping mechanism or chuck be properly timed in relation to the operation of the mechanism for feeding the stock forward a predetermined distance, and it is among the objects of the present invention to provide a simple, positive, rugged and quick operating means for effecting a complete cycle of releasing the bar stock from the gripping collet or chuck, feeding the bar forward a predetermined distance, causing the stock to be gripped and then retracting the stock feeding mechanism so that it will be in position to repeat the cycle.

Other objects of my invention are: the provision of positively operated mechanism for feeding and chucking bar stock in hollow spindle machine tools together with automatic means for causing the mechanism to complete a single cycle of its operation and then stop; the provision of improved control means for automatic chuck and bar feed devices whereby movement of one of the operating parts of the machine tool, for instance the tool slide operating lever, may be utilized to actuate the control mechanism which starts the cycle of stock feeding and chucking operations; the provision of an improved stock feeding and chucking mechanism which may be easily and accurately adjusted to feed different lengths of stock; and the provision of stock feeding and chucking mechanism of the type described in which the proper timed relation of the feeding and chucking operation is positively and definitely maintained but in which the feeding and chucking operations may be effected manually when desired independently of the power driven operating mechanism.

In the drawings I have illustrated my invention as applied to a simple hand operated type of screw machine having a hollow spindle and a hand actuated transverse tool slide.

Figure 1 of the drawings is a fragmentary perspective view of such a machine with my improved bar feed and chuck mechanism installed thereon.

Figure 2 is a vertical cross-section through the center of the rotating spindle of the machine, some of the operating parts of the bar feed and chuck mechanism being illustrated in view.

Figure 3 is a developed view of the cam drum which actuates the bar feed and chuck.

Figure 4 is a development of the cam which controls the operation of the driving clutch.

Figure 5 is a cross-sectional view taken substantially on line 5—5 of Figure 2, and including the clutch trigger lever and spring pressed plunger for actuating same.

Figure 6 is an enlarged cross-sectional view taken on line 6—6 of Figure 5 and illustrating the spring pressed plunger and trigger lever.

Figure 7 is a fragmentary elevation of the lever for operating the tool slide of the machine together with the adjustable ducking trip for actuating the trigger mechanism.

Figure 8 is an enlarged side elevation of the ducking trip device taken substantially on line 8—8 of Figure 7.

Figure 9 is a cross-sectional view taken on line 9—9 of Figure 8.

Referring now to the drawings, the rotating spindle 1 of the machine is supported in a suitable housing 2 and may be provided with the usual gear box and driving mechanism indicated at 3 in Figure 1. A tapered collet 4 is carried at the work gripping end of the spindle and the collet chuck member 5 has an end portion adapted to engage the bar and a tubular sleeve portion 6 slidably supported in the spindle 1. A collet operating tube or sleeve 7 is slidably carried within the spindle 1 and has a flange 8 at its outer end. This sleeve 7 engages the end of the collet chuck 5 and has a flanged end 8 which is engaged by the chuck operating fingers 9 which are pivotally mounted on suitable supports 10 carried by and rotatable with the spindle 1. A sliding wedge 11 is keyed to the spindle 1 and provided with a groove 12 in which is disposed a pair of shoes 13 carried by the yoke end 14 of the chuck operating lever 15.

The spindle 1 may be mounted in bearings as indicated at 16 and 17 in Figure 2 and it will be seen that the sliding wedge member 11 engages the rollers 18 at the ends of the fingers 9 and, when the wedge is slid along the spindle 1 to the left (Fig. 2), the fingers 9 will be spread apart and moved about their pivots 10 thus causing the portions of the fingers which engage the shoulder 8 of the chuck operating sleeve 7 to move the sleeve to the right and push the tapered end of the chuck collet member 5 into the correspondingly beveled portion of the collet 4. This, of course, will cause the bar 19 to be gripped firmly and driven with the spindle 1. When the wedge member 11 is moved to the right the force tending to spread the fingers 9 apart will be removed and the grip of the collet chuck upon the bar released.

The chuck operating lever 15 is pivotally mounted on the frame of the machine tool at 20 and its lower end carries a roller 21 disposed in the cam groove 22 of the cam drum 23. Included in the stock feeding mechanism is the head 24 carried by a bracket 25 slidably supported on the bars 26 and 27 which in turn are supported at their inner ends on the frame of the machine and at their outer ends by any suitable support (not shown). Secured to the head 24 is a tube 28 which extends into the hollow spindle 1 within the tubular chuck operating sleeve 7. The inner end 29 of the tube 28 is split and is adapted to have a spring friction engagement with the bar stock 19. When the chuck 5 is released and the head 14 is moved to the right (Fig. 2) the bar 19 will be fed forwardly due to the frictional engagement of the end 29 of the tube 28 with the stock. However, when the stock 19 is gripped by the chuck 5 such gripping action will be greater than the spring grip of the end 19 of the feeding tube 28 upon the stock and the tube 28 may be retracted to its outer position, the end 29 merely sliding over the surface of the bar 19.

In order to impart the required reciprocating movement to the head 24 I provide a linkage which includes a lever 30 pivoted at one end to the bracket 25 and at its lower end to one end of a link 31, the other end of which is pivoted at 32 to the stationary frame of the machine. A connecting rod 33 is pivotally connected to the lever 30 between its ends and has an adjustable connection with the T-slotted oscillating lever 34. This oscillating lever 34 carries a cam follower roller 35, similar to the follower roller 21 of lever 15, which is disposed in the cam slot 36 of the drum 23. At its lower end the oscillating lever 34 is pivotally mounted at 37 to the frame of the machine.

As is best seen in Figure 1 the connecting rod 33 is adjustably and pivotally secured to the lever 34 by means of a bolt 38 which has a head disposed in the T-slot 34' of the lever 34. When the nut 39 is tightened the end of the connecting rod 33 is secured in the T-slot and when this nut is loosened the end of the connecting rod 33 may be adjusted upwardly or downwardly in the T-slot to vary the length of stroke of the upper end of the lever 30 and thus vary the distance the stock is fed at each operation of the stock feeding mechanism.

The cam drum 23 is keyed to a shaft 40 which, as shown in Figure 2, is supported in ball bearings 41 and 42 in the machine frame. A worm gear 43 is rotatably mounted on the shaft 40 and has on one of its faces a plurality of clutch teeth 44. The worm 45, which engages the worm gear 44, is mounted on a shaft 46 (see Fig. 5) which is also supported in the housing of the machine on suitable bearings and which extends outwardly of the housing at one end and carries the grooved pulleys 47. A belt 48 passes over one of the pulleys 47 and is driven by the motor 50. When the apparatus is in operation the motor 50, belt 48, pulleys 47, shaft 46, worm 45 and worm gear 43 are continuously driven. In order to effect the desired driving connection between the rotating worm gear 43 and the cam drum 23 I provide a sliding clutch 51 which has a cam groove 52 and is provided with teeth 53 adapted to engage the teeth 44 of the worm gear 43. The clutch 51 is slidably supported on a splined portion of the shaft 40, as is clearly seen in Figure 5, and may be slid axially thereof so that the teeth 53 are moved into or out of engagement with the teeth 43. When the teeth of the two elements engage the cam drum 23 will rotate with the worm gear 43 and when the teeth are disengaged the cam drum will remain stationary.

The mechanism which I provide for operating the clutch 51 is best seen in Figures 5 to 9 inclusive and includes a trigger lever member which may be broadly designated by the reference character T. This trigger lever member includes a shaft portion 54 which extends through and has a bearing in the cover plate 55 of the machine frame. Secured to the inner end of the shaft is the crank arm 56 which carries a cam follower roll 57. The follower roll 57 is disposed in the cam groove 52 of the clutch member 51. Projecting from the crank arm 56 is the spring plunger engaging arm 58 and mounted on the outer end of the shaft 45 is a hand tripping lever 59.

As is seen in Figure 6, the arm 58 is shaped to fit the inclined surfaces of the upper end of the spring pressed plunger 60 which has a sliding fit in a suitable aperture in the portion 61 of the cover plate 55. A spring 62 exerts a force tending to move the plunger 60 upwardly and the plate 63 has upwardly extending portions 64 which fit into vertical slots 65 in the lower end of the plunger 61 and prevent rotation of the plunger in its bore without interfering with its axial movement.

It will be seen that as the tripping lever 59 is moved the shaft 54 will be rotated and the arm 58 will swing about the center of the shaft 55. If the tripper 59 is moved to cause the bar 58 to move to the right (as seen in Figure 6) the plunger 60 will be depressed until the point 58' of the arm 58 just passes over the point 60' of the plunger 60. When this occurs the spring 62 will be effective to lift the plunger 60 causing the inclined surface of the top thereof to engage the correspondingly inclined surface of the arm 58 and snap the crank member 56 over into its other position. A similar action will occur when the trigger 59 is moved in the opposite direction and it is only necessary for the trip lever 59 to be moved until the point of the arm 58 passes over the point of the plunger 60 after which the spring 62 will cause the movement of the trigger lever assembly T to be completed. This mechanism is effective in the preferred operation of my apparatus, as will be explained later.

A trigger lever operating rod 66 (see Fig. 1) is adjustably carried by the connecting member 67 which in turn is pivotally supported on the lug 68 of the tripper 59. The rod 66 may be supported at 69 and 70 on the housing of the machine and its end is disposed in position to be actuated by the ducking trip 71. This ducking trip is carried by a supporting member 72 which is clamped on to the shaft 73 by means of a suitable screw 74. The shaft 73 also carries the hand tool feed lever 75 and gear 76 which engages a suitable rack on the transverse tool slide of the machine. When the lever 75 is moved towards the spindle the front tool holder will be moved towards the work and when the lever 75 is moved away from the spindle the tool is retracted.

In the preferred operation of my apparatus I so arrange the ducking trip 71 so that, as the lever 75 is moved away from the spindle 1 to withdraw the tool from the work, the inclined face 77 of the ducking trip 71 engages the end of the rod 66 and moves it to the left causing the trigger lever T to engage the clutch 51 and starting a stock feeding and chucking cycle. As the lever 75 is then moved toward the spindle 1 to perform the next cutting operation the straight face 79 of the ducking trip engages the end of the rod 66 but exerts no axial push thereon because, when this occurs, the trip 71 merely rotates on its shaft 79 and ducks into the recess 80 in the face of the supporting member 72. A spring 81 has one end attached to the shaft 79 so that, as soon as the ducking trip has moved past the end of the rod 66 towards tool feeding movement, it will snap back into the position shown in Figure 9 and will be ready to again actuate the rod 66 and the trigger lever T on the next tool advancing movement of the lever 75. The trip 71 may be secured to the shaft 79 by a pin 82.

Having thus described the illustrated apparatus which embodies one form of my invention I will now explain the operation thereof:

When the parts are in the positions shown in Figures 1 and 2, the clutch 51 is in its disengaged position, the collet chuck is gripping the stock and is being held in gripping position by the fingers 9 which are spread apart by the tapered member 11; the stock feeding head 24 and the operating linkage therefor are in their retracted position and the tool feed lever 75 has been moved away from the spindle until the tool is completely withdrawn from the stock, and the inclined face 77 of the ducking trip 71 has engaged the end of the rod 66 and moved this rod to the left imparting a corresponding movement to the trigger lever 59. As shown, the ducking trip 71 has moved beyond the end of the rod 66.

As will be more fully explained later, when the trip 71 moves the rod 66 to the left the crank member 56 is snapped over to the right, or towards the tool slide, carrying with it the sliding clutch 51 and causing the teeth 53 of the clutch member to engage the teeth 44 of the worm gear 43. A complete cycle of the stock feeding and chucking operations then takes place as the cam drum 23 makes one complete revolution and is then automatically stopped by the trigger mechanism. During the rotation of the cam from the position and in the direction shown in Figure 2, the lower end of the lever 15 is first moved to the left, causing the upper end of this lever to withdraw the wedge member 11 from engagement with the fingers 9 thus permitting the collet chuck 5 to loosen its grip upon the stock.

After this operation is completed the cam groove 36 is effective to move the roller 35 on the T-slot member 34 to the right, which in turn, through the connecting rod 33 and the links 30 and 31, moves the bar feeding head 24 toward the spindle a predetermined distance thus feeding the stock forward through the spindle and collet chuck. After the feeding operation is completed and while the feeding head remains in its advanced position the lower end of the lever 15 is again moved to the right, this occurring at the portion of the cam slot 23 marked A in Figure 3, with corresponding movement of the upper end of the lever 15 and the wedge member 11 to the left into the position shown in Figure 2 whereby the outer ends of the fingers 9 are spread apart and the collet chuck 5 is caused to grip the bar 19. After the gripping action is completed the T-slot arm 34 is moved to the left by the portion marked B of the cam 23 in Figure 3. This movement retracts the feeding head 24 and the tubular actuating member 28, the friction gripping end portion 29 thereof sliding over the surface of the bar 19 which at this time is firmly gripped by the collet chuck 5. When this movement is completed the cam drum 23, the clutch member 51 and the worm gear 43 have made one revolution and are then automatically stopped by the trigger lever T and its associated parts in the manner described below.

It will be seen that when the above operations have been completed the parts of the mechanism will be in the positions illustrated in Figure 1. The next movement of the tool slide lever 75 will be towards the machine spindle to cause a tool to operate on the projecting end of the firmly gripped and rotating bar 19. During the first part of this movement of the lever 75 the face 78 of the ducking trip 71 will engage the end of the rod 66 but will merely turn on its axis and slip past the rod without moving it. However, after the cut has been completed and the tool is being retracted from the work by movement of the lever 75 away from the spindle, the inclined face 77 of the ducking trip 71 will again engage the end of the rod 66 and move it to the left actuating the trip lever 59 and causing the cycle of stock release, stock feed, stock gripping, and retraction of the stock feeding mechanism to again occur.

When the trigger member T, and particularly the tripping lever portion 59 thereof, is moved to the left from the positions shown in Figures 1, 5 and 6, the crank portion 56 thereof and the roller 57 will move to the right. When this occurs the roller 57, which is in engagement with the projection 52' of the cam groove 52 of the sliding clutch member 51 (see Fig. 4), will move the clutch to the right so that the teeth 53 engage the teeth 44 and a driving connection is completed between the rotating worm gear 43 and the main cam drum 23. This movement of the trigger lever member T causes the extending arm 58 thereof to snap over from one side of the pointed end of the plunger 60 to the other side thereof and as the clutch member 51 continues its rotation the roller 57 moves to the right against the right hand face of the cam groove 52 (indicated at C in Figure 4) and remains in this position until the clutch 51 has made a complete revolution whereupon the inclined face D of the projection 52' engages the roller 57 and moves the crank arm 56 to the left (Fig. 6) until the point 58' of the arm 58 just passes the point 60' of the plunger 60 after which the spring 62 completes the movement of the arm 58 to the left causing the roller 57 to engage the side E of the cam groove 52 and move the clutch to the left until the teeth 53 are thrown out of engagement with the teeth 44 whereupon rotation of the clutch member 51 will immediately cease. This stopping of the rotation will occur while the roller 57 is on the flat spot of the projection 52' of the cam groove 52. The parts will now be back in their original position and ready for another operating cycle.

If it is desired to operate the stock gripping chuck manually and independently of the cam actuated mechanism such operation can be effected by applying a wrench or handle to the squared end 20' (Fig. 1) of the shaft 20 to which the lever 15 is keyed. In this manner the lever 15 may be moved manually to release the chuck, such movement being permitted by the enlarged portion F of the cam slot 22. In like manner the stock feed mechanism can be operated manually and independently if desired. The T-slot lever 34 may be swung to the right (Fig. 2) when desired due to the wide portion G of the cam slot 36. Such manual and independent operation of the stock chuck and feed mechanisms will not interfere with the operation of the cam drum 23 which may be operated at any desired time by tripping the trigger lever T.

From the above description of a hollow spindle lathe embodying my invention it will be seen that I have provided a simple, positive and quick acting means for effecting the stock chucking and feeding operations of apparatus of the type described.

Although I have described the illustrated embodiment of my invention in considerable detail it will be understood by those skilled in the art that it may be readily changed or modified to suit various conditions and types of machines without departing from the spirit of my invention. I do not, therefore, wish to be limited to the specific form herein disclosed but claim as my invention all embodiments thereof coming within the scope of the appended claims.

I claim:

1. In stock feeding and chucking mechanism of the type described, the combination of a stock gripping chuck, a lever for operating said chuck, stock feeding means, a lever for actuating said stock feeding means, a cam drum having independent cam grooves, a follower member on each of said levers, said followers being disposed in said cam grooves, said cam grooves each having correspondingly disposed enlarged portions arranged to permit simultaneous manual operation of said chuck and said feeding means when said cam is in one angular position, and means for rotating said cam drum, said rotating means including a single rotation clutch and control means therefor whereby said clutch will always stop said cam drum with said enlarged portions of the cam grooves in alignment with said follower members.

2. In a machine tool of the type described, a stock chuck, stock feeding means, a cam having grooves for controlling the operation of said chuck and feeding means in timed relation, each of said grooves having enlarged portions arranged in the same angular relation whereby manual operation of said chuck and feeding means is permitted at one angular position only of said cam, and means for rotating said cam, said rotating means including a clutch and control means therefor whereby said cam will rotate through a single revolution and stop at said position where manual operation of said chuck and feeding means is permitted.

3. In a machine tool of the type described, a stock chuck, stock feeding means, a cam having grooves for controlling the operation of said chuck and feeding means in timed relation, each of said grooves having enlarged portions arranged in the same angular relation whereby manual operation of said chuck and feeding means is permitted at one angular position only of said cam, means for rotating said cam, said rotating means including a clutch and control means therefor whereby said cam will rotate through a single revolution and stop at said position where manual operation of said chuck and feeding means is permitted, and means for resisting rotation of said cam drum when in said manual operation position.

4. In apparatus of the type described, the combination of a stock gripping chuck, a lever for operating said chuck, stock feeding means, a lever for actuating said stock feeding means, a cam drum having cam grooves, a follower member on each of said levers, said followers being disposed in said cam grooves, a shaft for rotatably supporting said drum, a clutch member mounted on said shaft and rotatable with said drum while having axial movement relative thereto, a co-acting clutch member mounted on said shaft, means for driving said co-acting clutch member, and means for engaging said clutch members for a single revolution thereof and then disengaging them, said last named means including a cam groove in said first named clutch, a trigger lever having a member disposed in said cam groove, means for operating said lever to move said clutch members into driving engagement, said clutch member cam groove having a portion adapted to move said trigger lever part way in clutch disengaging direction upon completion of a single revolution, and spring means for completing the movement of said trigger lever in clutch disengaging direction.

5. In a machine tool of the type described having a tool slide, a stock chuck, stock feeding means, cam means for actuating said chuck and feeding means, a one revolution clutch for driving said cam means, a manually operable tripper lever for actuating said one revolution clutch, and connections from said lever adapted to be actuated by movement of the tool slide of the machine to control the operation of said clutch.

6. In a machine tool of the type described, a one revolution clutch, a manually operable tripper lever for actuating said clutch, a lug extending out from said lever, a lever operating rod slidingly supported on the machine, a connecting member adjustably secured to said rod and operatively engaging said lug on said lever whereby sliding movement of said rod will move said lug to control the operation of said clutch and rotational movement of said rod is restricted.

7. In combination in apparatus of the type described, a cam drum secured to a shaft, means for rotatably supporting said shaft, a one revolution clutch on said shaft, said clutch including a clutch cam member slidably mounted on said shaft and rotatable therewith, a co-acting clutch member rotatably mounted on said shaft and adapted to be engaged by said clutch cam member to complete a driving connection to said cam drum, a lever having a follower extending into a cam groove in said clutch cam member, means for moving said lever to cause engagement of said clutch members to start rotation of said cam drum, and a projection on the cam groove of said clutch cam member adapted to coact with the follower of said lever to disengage said clutch and restrain further movement of said cam drum after a single revolution.

8. In combination in apparatus of the type described, a cam drum secured to a shaft, means for rotatably supporting said shaft, a one revolution clutch on said shaft, said clutch including a clutch cam member slidably mounted on said shaft and rotatable therewith, a co-acting clutch member rotatably mounted on said shaft and adapted to be engaged by said clutch cam member to complete a driving connection to said cam drum, a lever having a follower extending into a cam groove in said clutch cam member, means for moving said lever to cause engagement of said clutch members to start rotation of said cam drum, a projection on the cam groove of said clutch cam member adapted to co-act with the follower of said lever to disengage said clutch and restrain further movement of said cam drum after a single revolution, and a spring pressed plunger having a pointed end adapted to engage a correspondingly shaped member on said lever to provide a snap-over movement of said lever when it is moved past its center position in either direction.

9. In a machine tool of the type described, a cross slide, a cross slide operating lever, a rod supported on said machine and adapted to have axial movement to control a machine function, one end of said rod being disposed adjacent said lever, and a docking trip mechanism movable with said lever, said mechanism including a supporting member, a trip secured to a shaft in said supporting member and having a straight face and an inclined face, spring means tending to turn said shaft and maintain said trip in position projecting out from said supporting member, said supporting member having a recess into which said trip may duck when the straight side thereof engages said rod, and means for stopping movement of said trip and shaft when the inclined side of the trip engages the end of the rod whereby an axial movement will be imparted to said rod when said tool slide lever is moved in one direction only.

OSKAR KYLIN.